Sept. 18, 1934.  G. COOTER  1,974,204
COOKING UTENSIL
Filed April 25, 1933    2 Sheets-Sheet 1
Fig. 1.
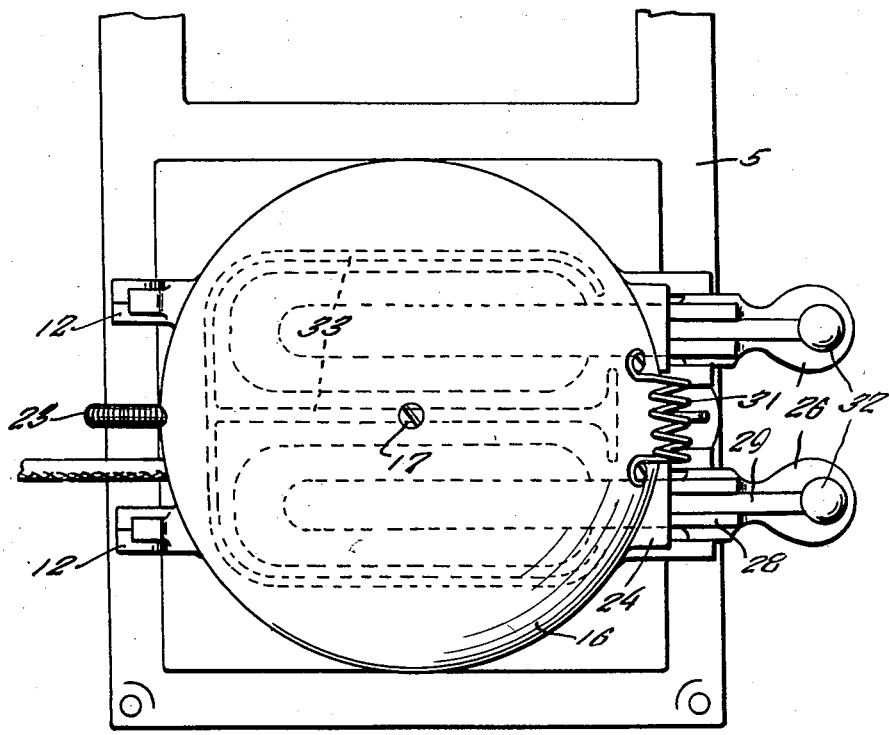
Fig. 5.  Fig. 6.
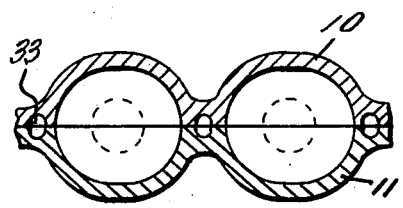 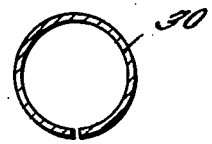
Fig. 7.
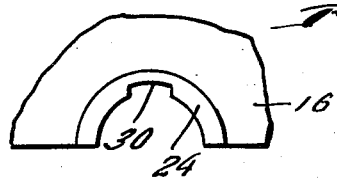
Inventor
George Cooter
By Clarence A. O'Brien
Attorney Sept. 18, 1934. G. COOTER 1,974,204
COOKING UTENSIL
Filed April 25, 1933 2 Sheets-Sheet 2
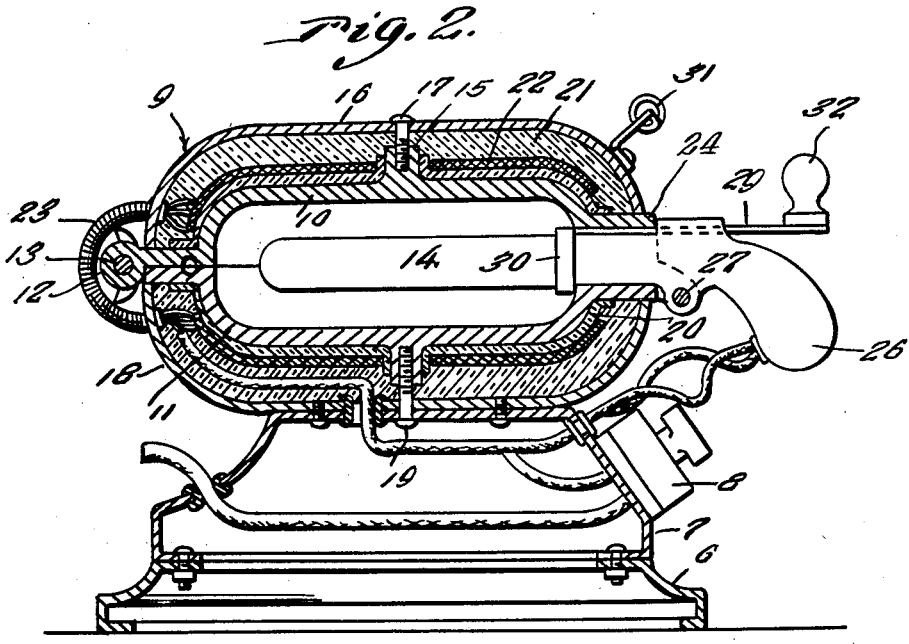
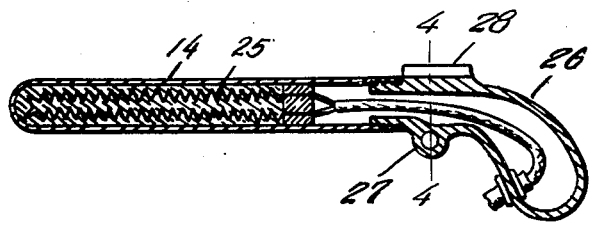
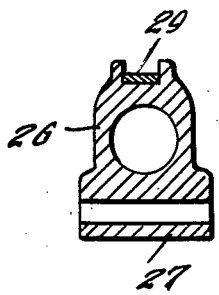
Inventor
George Cooter
By Clarence A. O'Brien
Attorney Patented Sept. 18, 1934

1,974,204

UNITED STATES PATENT OFFICE 1,974,204

COOKING UTENSIL

George Cooter, Spokane, Wash.

Application April 25, 1933, Serial No. 667,883

1 Claim. (Cl. 53—10)

This invention appertains to new and useful improvements in electrical cooking utensils and more particularly to a utensil in which various forms of breadstuffs can be cooked, and particularly rolls.

The principal object of the present invention is to provide a cooking utensil in which breadstuffs can be formed and cooked with a pocket therein for receiving a filler in the form of meat or other edibles after its removal from the utensil.

Other important objects reside in the simplicity of construction, low cost of manufacture and stable construction leading to durability in use.

These and various other important objects and advantages of the invention will become apparent to the reader of the following specification.

In the drawings:—

Figure 1 represents a top plan view of the utensil.

Figure 2 represents a vertical sectional view through the device.

Figure 3 represents a longitudinal sectional view through the pocket forming core and heater.

Figure 4 represents a sectional view taken substantially on line 4—4 of Figure 3.

Figure 5 represents a fragmentary sectional view through the mold plate.

Figure 6 represents a sectional view through the sliding separator.

Figure 7 represents a fragmentary side elevational view of the utensil.

Referring to the drawings wherein like numerals designate like parts, it can be seen in Figure 1, that numeral 5 represents a frame upon which any number of these utensil units can be mounted.

The unit per se consists of the base rim 6 upon which is secured the riser 7 which is hollow and has the switch 8 secured to the outside thereof.

Upon this riser is secured the upper and lower sections of the utensil proper generally referred to by numeral 9. This utensil includes the upper and lower mold plates 10—11, each of which is provided with an extension forming hinge knuckles 12 through which the hinge pin 13 is disposed for hingedly connecting the said mold plates together. Each of these mold plates is formed with a plurality of depressions so that when the sections are brought together, a compartment will be formed in which an article of foodstuff can be cooked around the core 14. The top of the plate 10, as well as the bottom of the plate 11, has a boss 15 thereon. A shell 16 is secured over the mold plate 10 by a screw 17 driven into the boss 15, while the lower plate 11 has a shell 18 secured thereto by a screw 19 which passes upwardly through the riser 7, shell 18, to thread into the boss of the lower plate 11.

The outer sides of the plates 10 and 11 are covered by mica sheets 20, while interposed between these sheets and di-electric fillers 21 are the heating elements 22. A spring conduit 23 between the sections provides a protector for connections between the heating elements of the two sections.

The plates 10 and 11 are provided with semi-cylindrical extensions which, when brought together, form necks 24 extending outwardly beyond the corresponding shells 16 and 18. As is clearly shown in Figure 3, the aforementioned core 14 is provided with a di-electric filler in which is embedded the heating element 25. One end of the core 14 is attached to the pistol-type handle 26 which is pivotally connected to the lower section of the corresponding neck 24, as at 27. A pair of guide ribs 28 is located upon each handle 26 for guiding a corresponding slide 29 which is also slidable through the channel 30 in the uppermost section of the neck 24, as shown in Figures 2 and 7. To the inner end of this slide 29 a band 30 is secured which circumscribes the core 14 and acts as a separator for separating the cooked article from the core after the article has been cooked.

The top section of the utensil is provided with a handle 31 and the slide 29 is provided with a knob 32. By referring to Figure 5, it can be seen that surrounding each depression in each of the mold plates 10 and 11 is an overflow groove 23.

Obviously, after an article has been cooked in this utensil, the upper section can be swung back and subsequently the handle 26 can be tilted so as to elevate the core 14, after which the knob 32 can be actuated so as to slide the separator 30 along the core to separate the cooked article from the core, after which the article can be filled with the desired foodstuff.

While the foregoing specification sets forth the invention in specific terms, it is to be understood that numerous changes in the shape, size and materials may be resorted to without departing from the spirit and scope of the invention, as claimed hereinafter.

Having described the invention, what is claimed as new is:—

A cooking utensil of the character described comprising a pair of mold plates, heating means for the mold plates, said mold plates being provided with depressions forming a cooking compartment, a pocket-forming core for disposition into the said compartment, and a snug fitting band slidable on the said core for separating a cooked article therefrom and manual means for operating the band.

GEORGE COOTER.